Patented May 27, 1924.                                                1,495,517

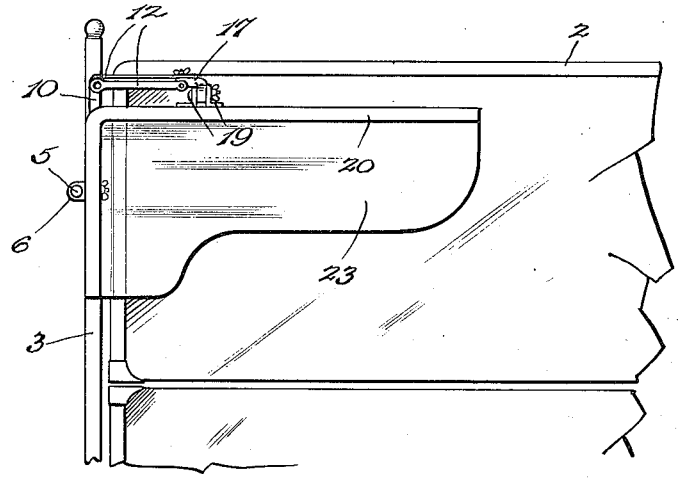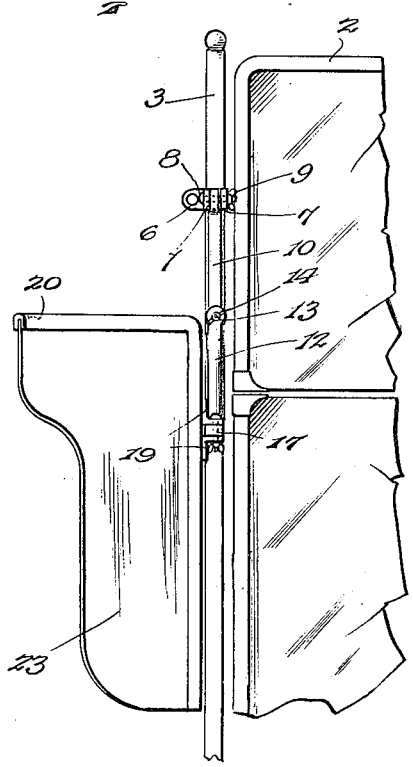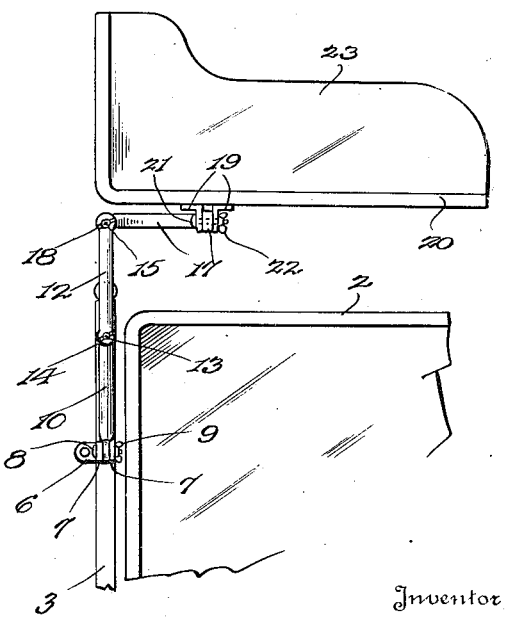

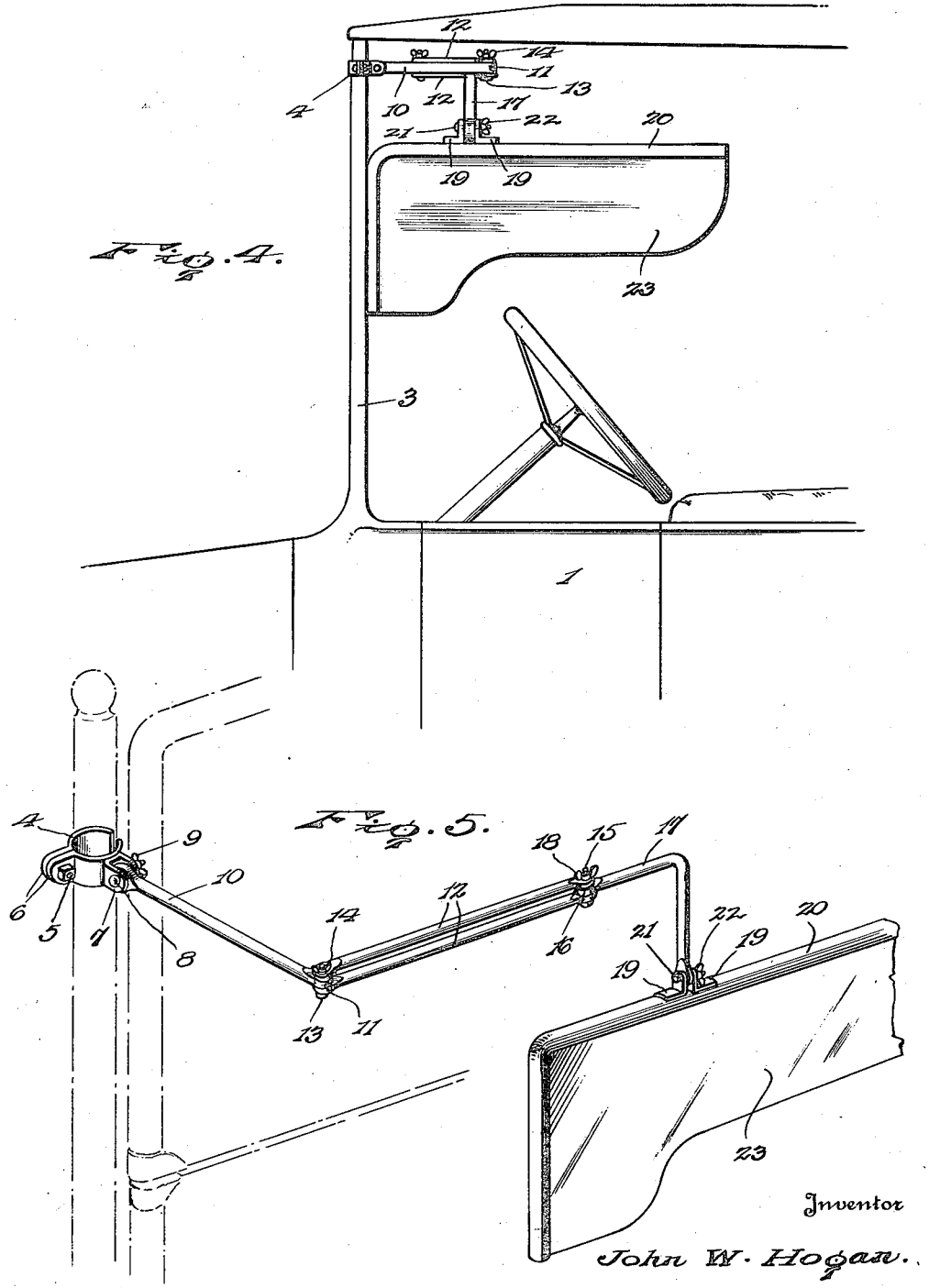

UNITED STATES PATENT OFFICE.

JOHN W. HOGAN, OF WILMINGTON, DELAWARE, ASSIGNOR OF ONE-THIRD TO HARRY E. ALGARD AND ONE-THIRD TO EARL M. CLOUSER, BOTH OF WILMINGTON, DELAWARE.

ATTACHMENT FOR WINDSHIELDS.

Application filed January 5, 1923. Serial No. 610,835.

*To all whom it may concern:*

Be it known that I, JOHN W. HOGAN, a citizen of the United States, residing at Wilmington, in the county of New Castle and State of Delaware, have invented certain new and useful Improvements in Attachments for Windshields, of which the following is a specification.

This invention is an attachment for the windshields of automobiles, and has for its object the provision of a simple and inexpensive device which may be adjusted readily to any position desired by the chauffeur and which, when in use, may be set to protect the chauffeur or other occupants of the vehicle from wind and rain or from the blinding glare of the sun or the headlights of an approaching vehicle or from the reflection of wet streets or pavements. The invention also seeks to provide an attachment for the stated purpose which may be readily applied to or removed from the windshield and which may be used at either side of the windshield as may be desired. The invention is illustrated in the accompanying drawings and will be hereinafter fully set forth.

In the drawings:

Figure 1 is a rear elevation of a portion of a windshield showing my attachment arranged to shield the chauffeur from the glare of headlights on an approaching vehicle or the glare from a low sun;

Fig. 2 is a similar view showing the device arranged at the side of the windshield so as to protect the operator from strong wind or a driving rain;

Fig. 3 is a similar view showing the device arranged above the windshield to protect the operator from the glare of the sun when the top of the vehicle is lowered;

Fig. 4 is a side elevation of a portion of an automobile showing the device arranged at the side thereof so as to protect the chauffeur from a side rain or wind or from the glare of sun which may be at his left side, and Fig. 5 is an enlarged perspective view of the attachment and its mounting.

The automobile 1 and the windshield 2 may be of any known or preferred type, the windshield being supported by and between side posts 3. In carrying out my invention, I employ a split collar or clamping ring 4 which is adapted to fit around one post or end of the windshield frame and be secured firmly thereon by a clamping bolt 5 inserted through lateral lugs or ears 6 of the collar. The collar is also provided with spaced ears or lugs 7 which will project rearwardly when the collar is in position, and through the said ears is fitted a pivot bolt 8 equipped with a set nut 9 so that the ears may be clamped against the end of an arm 10 which is disposed between the ears and engaged about the pivot bolt 8, as will be readily understood. The arm 10 is obviously capable of pivotal movement in a vertical plane and at its free end it is constructed with an eye 11 adapted to fit between the ends of links 12 and be pivotally connected therewith by a bolt 13 inserted through the eye 11 and through corresponding eyes at the ends of the links, a set nut 14 being mounted upon the said pivot bolt 13 so as to secure the links in any position in which they may be set relative to the arm. The ends of the links 12 remote from the arm 10 are also formed into eyes to receive a pivot bolt 15 inserted through them and through an eye 16 upon a carrying arm or bracket 17 disposed between the links, as clearly shown. A set nut 18 is mounted upon the bolt 15 and adapted to clamp the links 12 and the bracket or arm 17 in any set relation. The arm 17 is of right angular formation, as shown most clearly in Fig. 5, and has one end inserted between brackets 19 permanently fitted upon a frame 20, a pivot bolt 21 being inserted through said brackets and the end of the arm 17 and equipped with a set nut 22 whereby the parts may be secured in a set position. The frame 20 may be of any durable material and is of right angular form and adapted to secure the edge of a plate 23 of translucent material, the said plate being approximately equal in length to one-half the width of the windshield and of sufficient height to protect the chauffeur's eyes from the blinding effect of glaring headlights or a low sun, as will be readily understood. The plate 23 may be of colored glass or of celluloid or of any other suitable material which prevents the passage of strong blinding light without totally obscuring the vision or view ahead.

It will be readily noted that the links 12 may be adjusted pivotally about the free end of the arm 10 in the plane of the said arm at right angles to the plane of the movement of the arm, and the arm 17 may be adjusted pivotally about the ends of the links 12 in the plane of the said links, but, owing to the right angular form of the said carrying arm 17, the shield 23 may be brought into any desired position relative to the supporting structure, for while it is capable of only a pivotal movement about the end of the bracket or carrying arm 17, the pivotal mounting of said arm in the links 12 with the shape of the arm permits the operator to bring the shield into any desired position. In Fig. 1, the device is shown with the basal supporting arm 10 extending upwardly from the anchoring collar 4, the links 12 extending inwardly across the windshield adjacent the top of the same and parallel therewith, while the arm 17 is thereby brought into such a position that it extends inwardly from the links in alinement therewith and then rearwardly substantially in the horizontal plane of the links so that the shield will depend from the said arm close to the windshield and in a vertical plane or obliquely, as may be preferred. In this position, the chauffeur will be protected from the glare of headlights on an approaching vehicle or from the blinding glare of a setting sun toward which he may be directly driving. In Fig. 2, the device is shown adjusted to assume a vertical position at the side of the windshield so that it will deflect driving wind or rain from the chauffeur or other occupants of the vehicle and will also protect him from the effects of a setting or low sun which may be shining somewhat to the side of the vehicle. By swinging the links 12 into alinement with the arm 10 and then causing the said arm 10 to assume a vertical position extending upwardly from the collar 4, the shield will be brought into position above the windshield 2, as shown in Fig. 3, so that it will protect the chauffeur from the glare of the sun when the top of the automobile is down. In Fig. 4, I have shown the device in a position it may assume at the side of the vehicle and parallel or approximately parallel therewith, and it will be readily understood that the particular mounting of the device permits it to assume various positions according to the convenience or desires of the operator. The device may be mounted at either side of the windshield or may be employed in pairs, one member of each pair being mounted at each side of the vehicle so that, if they be brought together across the windshield, they will constitute a visor. The device is very simple in the construction and arrangement of its parts and provides for a universal adjustment of the shield so that it may be set in an indefinite variety of positions and will protect the chauffeur from the distracting effects of the sun or a driving wind or rain under all conditions.

Having thus described the invention, what is claimed as new is:

1. An attachment for windshields comprising a collar adapted to be secured at the end of a windshield, a supporting arm pivotally secured to said collar for movement in a vertical plane and held against lateral movement, links pivotally attached to the end of said arm for movement in a plane at a right angle to the plane of movement of said arm, an angular bracket pivotally attached to the said links, a translucent plate, and a pivotal connection between said plate and the angular bracket, the translucent plate being parallel with that end portion of the bracket which is attached to the links.

2. An attachment for the windshields of automobiles comprising a collar to be secured at the end of the windshield, ears on said collar, an arm having one end disposed between said ears and pivotally connected thereto whereby it may have movement in a single plane, means for securing the arm in a set position relative to said ears, links pivoted to the free end of said arm for movement in a plane at right angles to the plane of movement of the arm, means for securing said links in a set position relative to the arm, and an angular bracket having one end pivotally mounted between the free ends of said links, a translucent plate, lugs permanently connected with said plate and pivotally attached to one end of the angular bracket, the opposite end portion of the bracket being parallel with the plate, means for securing the angular bracket in a set position relative to the links, and means for securing the translucent plate in a set position relative to the bracket.

3. The combination with a windshield, and a windshield support, of an arm mounted on the support for pivotal movement in the vertical plane of the support and normally extending rearwardly therefrom, a link pivotally attached to the rear end of said arm for movement in a plane at a right angle to the plane of movement of the arm, a translucent plate, and a bracket having its end portions disposed at an angle to each other and having one end attached to the end of the link to be alined therewith or moved pivotally about the same in a plane parallel to the plane of movement of the link, the opposite end of the bracket being pivotally attached to the translucent plate with said plate extending parallel with the first-mentioned end portion of the bracket.

In testimony whereof I affix my signature.

JOHN W. HOGAN. [L. S.]